(12) United States Patent
Zuchlewski et al.

(10) Patent No.: US 12,474,978 B2
(45) Date of Patent: *Nov. 18, 2025

(54) AUTO PAUSE INCIDENT NOTIFICATION

(71) Applicant: PagerDuty, Inc., San Francisco, CA (US)

(72) Inventors: Laura Ann Zuchlewski, Shoreline, WA (US); Irena Grabovitch-Zuyev, Quispamsis (CA); Shaheen Bundhoo, Toronto (CA)

(73) Assignee: PagerDuty, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,184

(22) Filed: Aug. 14, 2023

(65) Prior Publication Data

US 2023/0385135 A1    Nov. 30, 2023

Related U.S. Application Data

(63) Continuation of application No. 17/488,452, filed on Sep. 29, 2021, now Pat. No. 11,768,720.

(51) Int. Cl.
| | |
|---|---|
| *G06F 9/54* | (2006.01) |
| *G06F 9/48* | (2006.01) |
| *H04L 41/06* | (2022.01) |
| *H04L 67/02* | (2022.01) |

(52) U.S. Cl.
CPC ............ *G06F 9/542* (2013.01); *G06F 9/485* (2013.01); *G06F 9/547* (2013.01); *H04L 41/06* (2013.01); *H04L 67/02* (2013.01)

(58) Field of Classification Search
CPC ............................ G06F 9/542; G06F 16/1734
See application file for complete search history.

(56) References Cited

U.S. PATENT DOCUMENTS

| | | | |
|---|---|---|---|
| 8,903,923 B2 * | 12/2014 | Pinel | G06Q 10/0631 709/206 |
| 9,191,399 B2 | 11/2015 | Davis et al. | |
| 9,521,035 B2 | 12/2016 | Ganguly et al. | |
| 10,997,001 B2 | 5/2021 | Arendt et al. | |
| 11,586,972 B2 * | 2/2023 | Wang | G06F 16/2465 |
| 2020/0311104 A1 | 10/2020 | Raviv et al. | |

* cited by examiner

*Primary Examiner* — Andy Ho
(74) *Attorney, Agent, or Firm* — Young Basile Hanlon & MacFarlane, P.C.

(57) ABSTRACT

Pausing alert notifications includes determining that an alert is likely transient responsive to identifying, based on data in a rolling table, that 1) a first number of most recently resolved alerts that are similar to the alert is greater than a predetermined minimum number and 2) at least a predetermined second number of the most recently resolved alerts that are similar to the alert were transient. Responsive to determining that the alert is likely transient, transmission of a notification associated with the alert is withheld during a pause period. A determination is made as to whether the alert is unresolved after a lapse of the pause period. Responsive to determining that the alert is unresolved after the lapse of the pause period, a responder is notified of the alert.

20 Claims, 7 Drawing Sheets

AUTO PAUSE INCIDENT NOTIFICATION

CROSS REFERENCES TO RELATED APPLICATIONS

This application is a continuation of U.S. patent application Ser. No. 17/488,452, filed Sep. 29, 2021, the entire disclosure of which is incorporated herein by reference.

TECHNICAL FIELD

This disclosure relates generally to computer operations and more particularly, but not exclusively to providing real-time management of information technology operations.

BACKGROUND

Information technology (IT) systems are increasingly becoming complex, multivariate, and in some cases non-intuitive systems with varying degrees of nonlinearity. These complex IT systems may be difficult to model or accurately understand. Various monitoring systems may be arrayed to provide events, alerts, notifications, or the like, in an effort to provide visibility into operational metrics, failures, and/or correctness. However, the sheer size and complexity of these IT systems may result in a flooding of disparate event messages from disparate monitoring/reporting services.

With the increased complexity of distributed computing systems existing event reporting and/or management may not, for example, have the capability to effectively process events in complex and noisy systems. At enterprise scale, IT systems may have millions of components resulting in a complex inter-related set of monitoring systems that report millions of events from disparate subsystems. Manual techniques and pre-programmed rules are labor and computing intensive and expensive, especially in the context of large, centralized IT Operations with very complex systems distributed across large numbers of components. Further, these manual techniques may limit the ability of systems to scale and evolve for future advances in IT systems capabilities.

SUMMARY

Disclosed herein are implementations of auto pause incident notification.

A first aspect is a method for pausing alert notifications. The method includes triggering an alert responsive to an event in a managed environment; obtaining a normalized title from a title of the alert; determining, using the normalized title, whether the alert is of a likely transient type, where the alert is of the likely transient type when it is predicted to resolve without human intervention; responsive to determining that the alert is the likely transient type, withholding transmission of notifications for the alert during a pause period; and, responsive to determining that the alert is unresolved after the pause period, transmitting a notification for the alert to a responder.

A second aspect is a device that includes a memory and a processor. The processor is configured to execute instructions stored in the memory to obtain a normalized title for an alert; determine, using the normalized title, whether the alert is likely transient, where a transient alert is one that resolves without human intervention; responsive to determining that the alert is of a likely transient type, withhold performance of an action for a pause period; and, responsive to determining that the alert is unresolved after a lapse of the pause period, perform the action.

A third aspect is a non-transitory computer readable medium storing instructions operable to cause a processor to perform operations that include predicting, using a prediction model, whether a condition will resolve during a pause period; responsive to predicting that the condition will resolve during the pause period, pausing performing an action for the pause period; and, responsive to determining that the condition did not resolve in the pause period, performing the action.

A fourth aspect is a method for pausing alert notifications. The method includes determining that an alert is likely transient responsive to identifying, based on data in a rolling table, that 1) a first number of most recently resolved alerts that are similar to the alert is greater than a predetermined minimum number and 2) at least a predetermined second number of the most recently resolved alerts that are similar to the alert were transient; responsive to determining that the alert is likely transient, withholding transmission of a notification associated with the alert during a pause period; determining whether the alert is unresolved after a lapse of the pause period; and responsive to determining that the alert is unresolved after the lapse of the pause period, notifying a responder of the alert.

A fifth aspect is a system for pausing alert notifications. The system includes a memory and a processor. The processor is configured to execute instructions stored in the memory to determine that an alert is likely transient responsive to a determination, based on data in a rolling table, that 1) a first number of most recently resolved alerts that are similar to the alert is greater than a predetermined minimum number and 2) at least a predetermined second number of the most recently resolved alerts that are similar to the alert were transient; responsive to a determination that the alert is likely transient, withhold transmission of a notification associated with the alert during a pause period; and responsive to a determination that the alert is unresolved after a lapse of the pause period, notify a responder of the alert.

A sixth aspect is a non-transitory computer readable medium that stores instructions operable to cause a processor to perform operations that include predicting that a condition is likely to resolve during a pause period based on data in a rolling table indicating that 1) a first number of most recently resolved conditions that are similar to the condition is greater than a predetermined minimum number and 2) at least a predetermined second number of the most recently resolved conditions that are similar to the condition were transient; responsive to predicting that the condition will resolve during the pause period, pausing performing an action associated with the condition for the pause period; and responsive to determining that the condition did not resolve in the pause period, performing the action.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
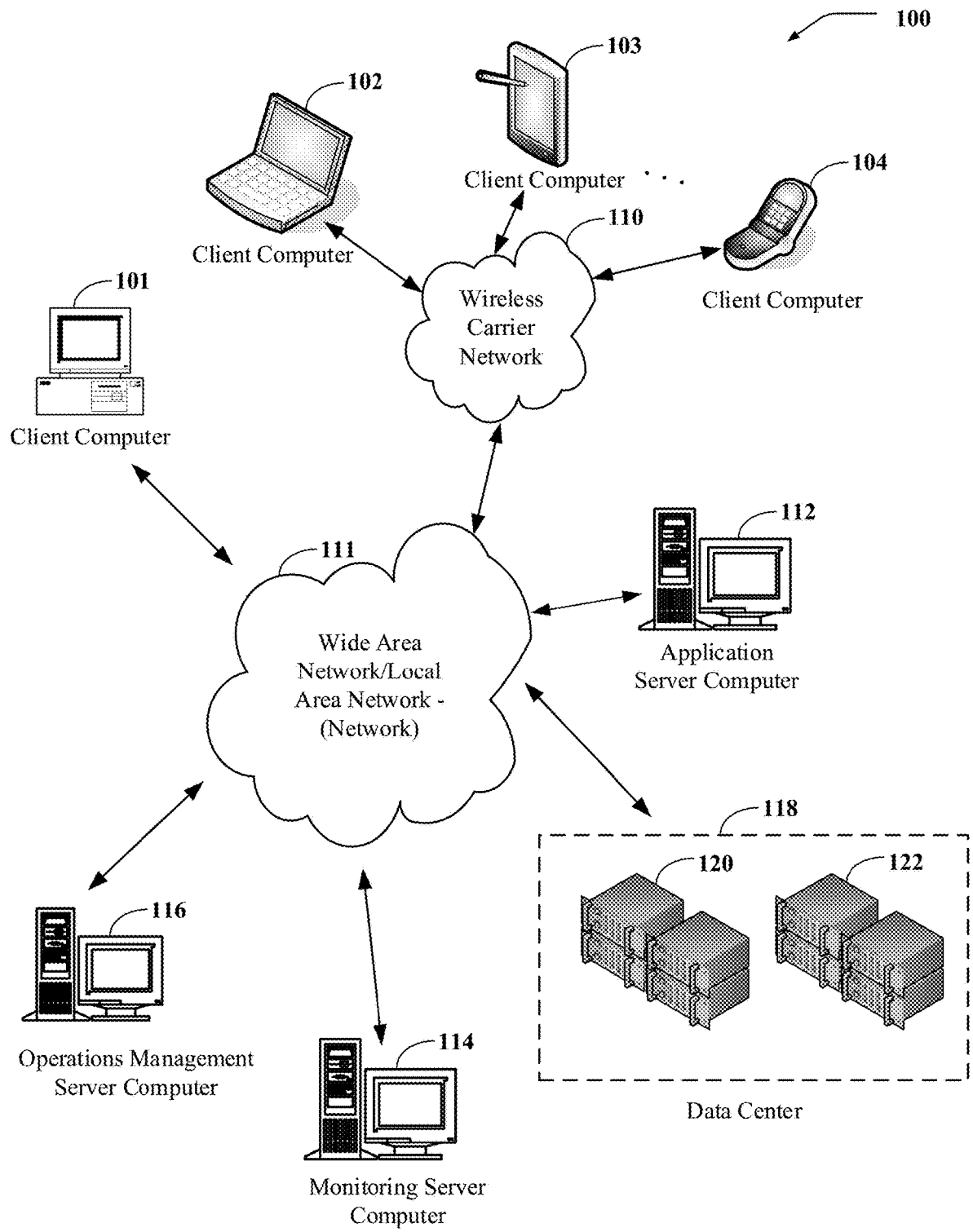
FIG. 1 shows components of one embodiment of a computing environment for event management.

An event management bus (EMB) is a computer system that may be arranged to monitor, manage, or compare the operations of one or more organizations. The EMB may be arranged to accept various events that indicate conditions occurring in the one or more organizations. The EMB may be arranged to manage several separate organizations at the same time. Briefly, an event can simply be an indication of a state of change to an information technology service of an organization. An event can be or describe a fact at a moment in time that may consist of a single or a group of correlated conditions that have been monitored and classified into an actionable state. As such, a monitoring tool of an organization may detect a condition in the IT environment of the organization and transmit a corresponding event to the EMB. Depending on the level of impact (e.g., degradation of a service), if any, to one or more constituents of a managed organization, an event may trigger (e.g., may be, may be classified as, may be converted into) an incident.

Non-limiting examples of events may include that a monitored operating system process is not running, that a virtual machine is restarting, that disk space on a certain device is low, that processor utilization on a certain device is higher than a threshold, that a shopping cart service of an e-commerce site is unavailable, that a digital certificate has or is expiring, that a certain web server is returning a 503 error code (indicating that web server is not ready to handle requests), that a customer relationship management (CRM) system is down (e.g., unavailable) such as because it is not responding to ping requests, and so on.

At a high level, an event may be received at an ingestion engine of the EMB, accepted by the ingestion engine and queued for processing, and then processed. Processing an event can include triggering (e.g., creating, generating, instantiating, etc.) a corresponding alert and a corresponding incident in the EMB, immediately sending a notification of the incident to a responder (i.e., a person, a group of persons, etc.), and/or triggering a response (e.g., a resolution) to the incident. The incident associated with the alert may or may be used to notify the responder who can acknowledge (e.g., assume responsibility for resolving) and resolve the incident. An acknowledged incident is an incident that is being worked on but is not yet resolved. The user that acknowledges an incident claims ownership of the incident, which may halt any established escalation processes. As such, notifications provide a way for responders to acknowledge that they are working on an incident or that the incident has been resolved. The responder may indicate that the responder resolved the incident using an interface (e.g., a graphical user interface) of the EMB.

However, some alerts may be transient. A transient alert is one that resolves within a relatively short period of time and without responder (e.g., human) intervention. For example, the EMB may receive another event indicating that the alert is resolved. To illustrate, a metric (e.g., processor utilization) may cross a danger line (e.g., greater than 50%), which triggers an alert by the EMB, but then quickly returns to a safe level (e.g., below 10%). Transient alerts may also be resolved automatically through orchestrations that effectuate change in order to resolve an alert without responder intervention.

Triggering incidents and immediate notifications for transient alerts can waste computation and network resources, and may degrade the performance of the EMB for other users, at least with respect to processing other events, alerts, and incidents. Additionally, notifying a responder of transient alerts may, at the least, lead to waste of computing, network, and memory resources, user frustration (such as by flooding the message box(es) of the responder with noisy, non-actionable notifications) and to a waste of the responder's time (such as in a case that an alert resolves while the responder may be in the early stages of root cause investigation of the alert, therewith wasting the responder's time). Notifications of transient alerts may also degrade the health of responders, such as, for example, due to late night or other interruptions. Notifications may shift the focus of a responder away from, and disrupt, whatever the responder is doing (e.g., sleeping, on a family weekend day at the park, at a holiday party with friends, and the like).

The possibility of degraded performance and increased usage of the computational and network resources may also include substantially increased investment in processing, memory, and storage resources and may also result in increased energy expenditures (needed to operate those increased processing, memory, and storage resources, and for the network transmission of the database commands) and associated emissions that may result from the generation of that energy.

Implementations according to this disclosure can auto-pause incident notification for alerts that are likely to be (e.g., predicted to be) transient. That is, if the EMB predicts that an alert is likely transient, the EMB does not sent any notification to any responder for a certain duration (i.e., a pause period), during which the transient alert is expected to resolve. That an alert is paused can also mean that no incident is triggered for the alert for the pause period. A paused alert can be said to be in a suspended state. If the alert is not resolved within the pause period, the EMB can un-pause the alert and transmit notifications regarding the alert to responders. For example, if the alert is not resolved during the pause period, the EMB can trigger an incident for the alert, which in turn can cause the notification to be transmitted to a responder.

Pausing alerts and pausing incident notifications may be used interchangeably. That is, pausing an alert can mean that no incident is triggered for the alert during a pause period; and pausing incident notification can mean that no incident object is triggered by an alert during the pause period of the alert. As can be appreciated, in some implementations or some systems, alerts can directly trigger notifications without first triggering incidents. Generally, the teachings herein can be used to delay the performance of a subsequent action that is triggered by or triggered after a preceding action by pausing an action (which may be the preceding action itself) that causes the triggering or initiation of the subsequent action when the preceding action is predicted, based on historical data, to be transient.

Auto-pausing alerts that are likely to be transient can preserve computational resources and reduce responder load. Auto-pausing alerts can minimize noise associated with the creation of incidents and notifications. Auto-pausing alerts can minimize noise by silencing alerts that may not require responses so that responders can focus only on events that require human intervention. Reducing noise (such as by auto-pausing alerts) can decrease overall total time spent in incident response at least because responders need not shift their focus to transient alerts.

The term "organization" or "managed organization" as used herein refers to a business, a company, an association, an enterprise, a confederation, or the like.

The term "event," as used herein, can refer to one or more outcomes, conditions, or occurrences that may be detected or observed by an event management bus. An event management bus (which can also be referred to as an event ingestion and processing system) may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events may be provided to the event management bus using one or more messages, emails, telephone calls, library function calls, application programming interface (API) calls, including, any signals provided to an event management bus indicating that an event has occurred. One or more third party and/or external systems may be configured to generate event messages that are provided to the event management bus.

The term "responder" as used herein can refer to a person or entity, represented or identified by persons, that may be responsible for responding to an event associated with a monitored application or service. A responder is responsible for responding to one or more notification events. For example, responders may be members of an information technology (IT) team providing support to employees of a company. Responders may be notified if an event or incident they are responsible for handling at that time is encountered. In some embodiments, a scheduler application may be arranged to associate one or more responders with times that they are responsible for handling particular events (.e.g., times when they are on-call to maintain various IT services for a company). A responder that is determined to be responsible for handling a particular event may be referred to as a responsible responder. Responsible responders may be considered to be on-call and/or active during the period of time they are designated by the schedule to be available.

The term "incident" as used herein can refer to a condition or state in the managed networking environments that requires some form of resolution by a user or automated service. Typically, incidents may be a failure or error that occurs in the operation of a managed network and/or computing environment. One or more events may be associated with one or more incidents. However, not all events are associated with incidents.

The term "incident response" as used herein can refer to the actions, resources, services, messages, notifications, alerts, events, or the like, related to resolving one or more incidents. Accordingly, services that may be impacted by a pending incident, may be added to the incident response associated with the incident. Likewise, resources responsible for supporting or maintaining the services may also be added to the incident response. Further, log entries, journal entries, notes, timelines, task lists, status information, or the like, may be part of an incident response.

The term "notification message," "notification event," or "notification" as used herein can refer to a communication provided by an incident management system to a message provider for delivery to one or more responsible resources or responders. A notification event may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term "team" or "group" as used herein refers to one or more responders that may be jointly responsible for maintaining or supporting one or more services or system for an organization.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one embodiment of a computing environment 100 for event management. Not all the components may be required to practice various embodiments, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 (e.g., client computers 102, 103, 104) may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IOT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one embodiment, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, the wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. In essence, the network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
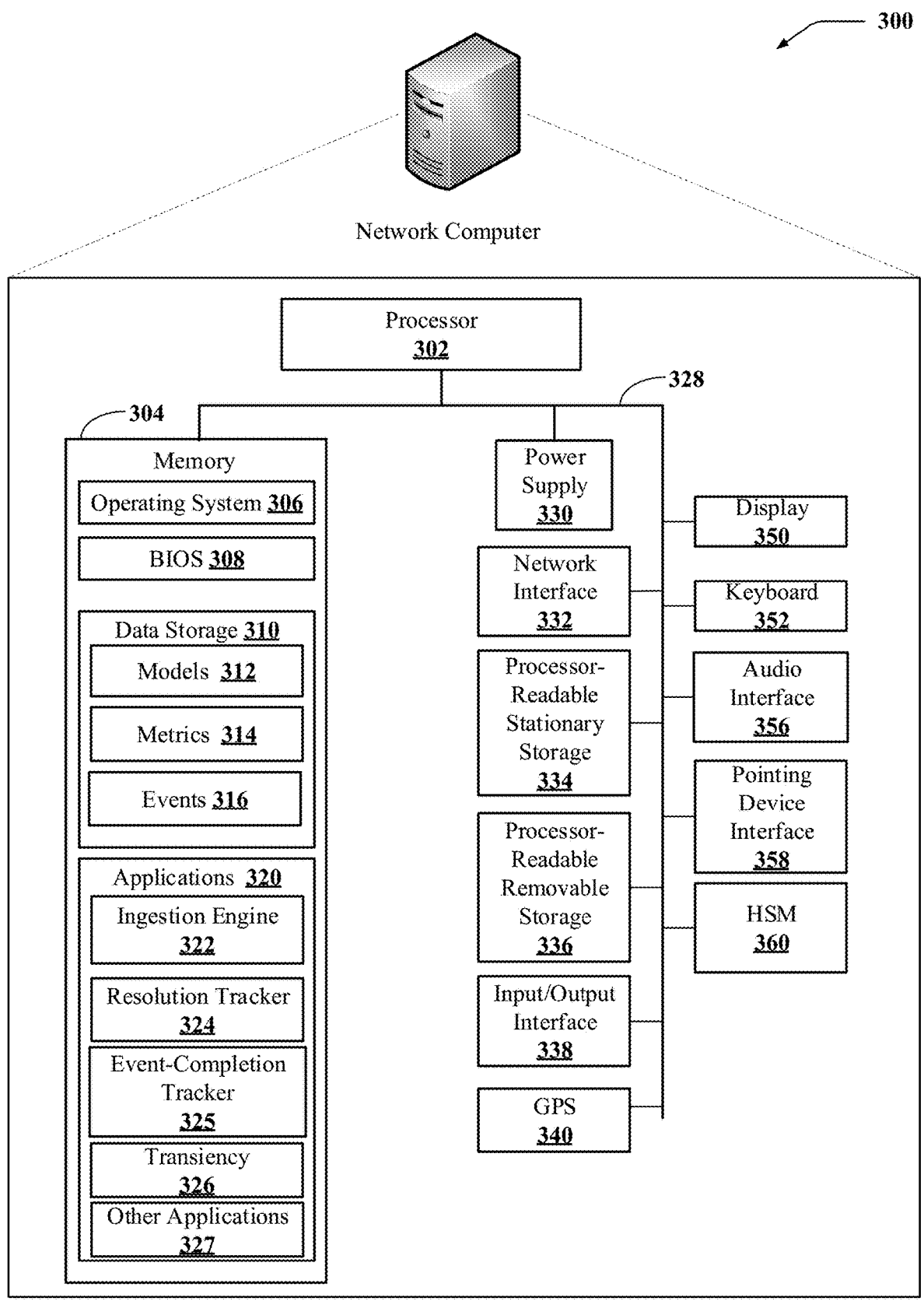
FIG. 3 shows one embodiment of a network computer that may at least partially implement one of the various embodiments.

The operations management server computer 116 may include virtually any network computer usable to provide computer operations management services, such as a network computer, as described with respect to FIG. 3. In one embodiment, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as, the monitoring server computer 114.

In at least one of the various embodiments, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some embodiments, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one embodiment, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some embodiments, one or more data centers, such as a data center 118, may be communicatively coupled to the wireless network 110 and/or the network 111. In at least one of the various embodiments, the data center 118 may be a portion of a private data center, public data center, public cloud environment, or private cloud environment. In some embodiments, the data center 118 may be a server room/data center that is physically under the control of an organization. The data center 118 may include one or more enclosures of network computers, such as, an enclosure 120 and an enclosure 122.

The enclosure 120 and the enclosure 122 may be enclosures (e.g., racks, cabinets, or the like) of network computers and/or blade servers in the data center 118. In some embodiments, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as, networks similar to and/or the including network 111 and/or wireless network 110. The data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
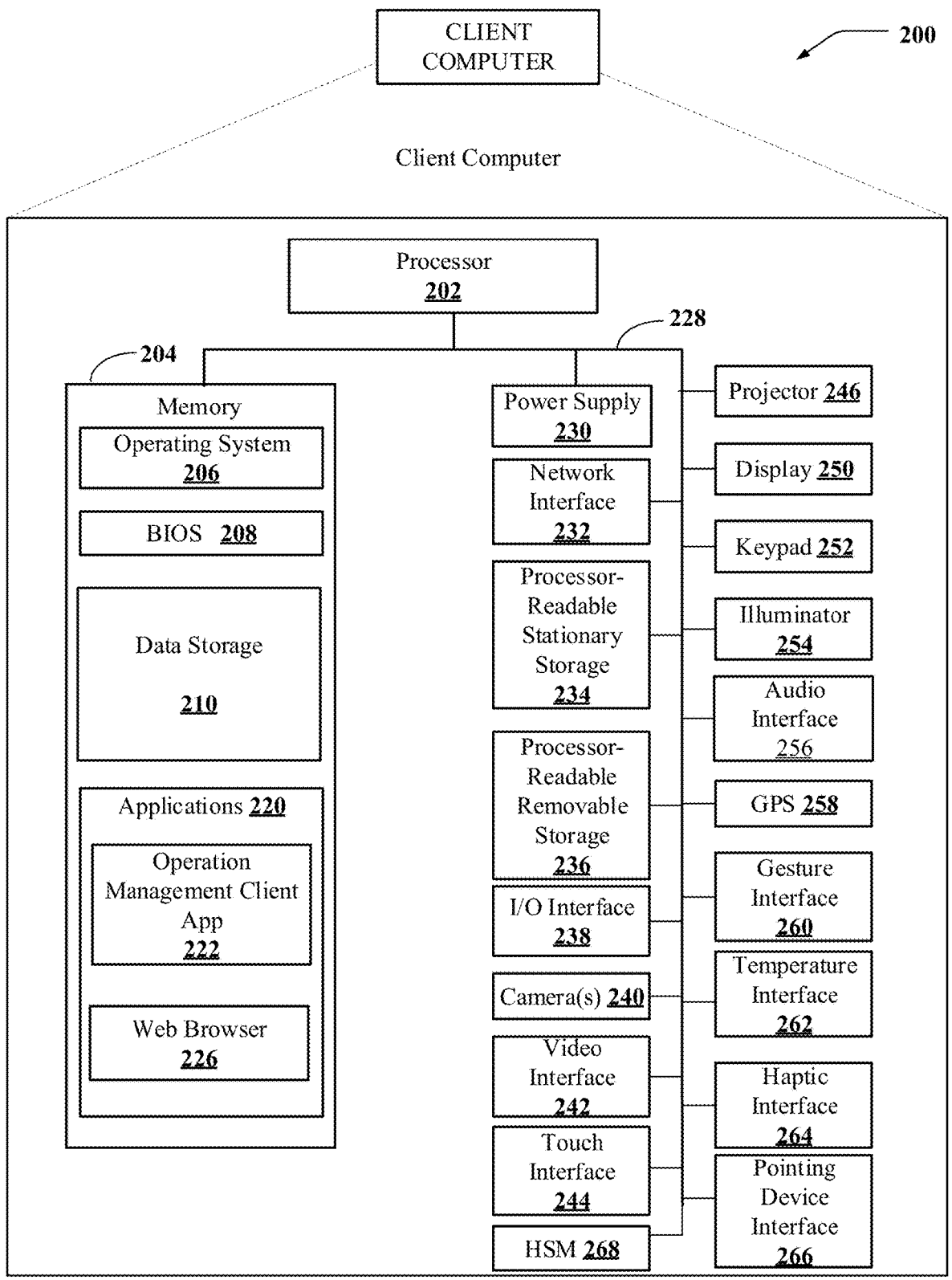
FIG. 2 shows one embodiment of a client computer.

FIG. 2 shows one embodiment of a client computer 200. The client computer 200 may include more or less components than those shown in FIG. 2. The client computer 200 may represent, for example, at least one embodiment of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver (i.e., GPS transceiver 258), an open air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one embodiment, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 268 may be a stand-alone computer, in other cases, the HSM 268 may be arranged as a hardware card that may be added to a client computer.

The I/O interface 238 can be used for communicating with external peripheral devices or other computers such as other client computers and network computers. The peripheral devices may include an audio headset, display screen glasses, remote speaker system, remote speaker and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open air gesture interface 260 may sense physical gestures of a user of the client computer 200, for example, by using single or stereo video cameras, radar, a gyroscopic sensor inside a computer held or worn by the user, or the like. The camera 240 may be used to track physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one embodiment, however, the client computer 200 may, through other components, provide other information that may be employed to determine a physical location of the client computer, including for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one embodiment, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various embodiments, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Additionally, in one or more embodiments (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer 200 may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one embodiment of network computer 300 that may at least partially implement one of the various embodiments. The network computer 300 may include more or less components than those shown in FIG. 3. The network computer 300 may represent, for example, one embodiment of at least one EMB, such as the operations management server computer 116 of FIG. 1, the monitoring server computer 114 of FIG. 1, or an application server computer 112 of FIG. 1. Further, in some embodiments, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one embodiment, however, the network computer 300 may, through other components, provide other information that may be employed to determine a physical location of the client computer, including for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows operating system, or the Apple Corporation's IOSO operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one embodiment, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may include an ingestion engine 322, a resolution tracker engine 324, an event-completion tracker engine 325, a transiency prediction engine 326, other applications 327. In at least one of the various embodiments, one or more of the applications may be implemented as modules or components of another application. Further, in at least one of the various embodiments, applications may be implemented as operating system extensions, modules, plugins, or the like.

Furthermore, in at least one of the various embodiments, the ingestion engine 322, the resolution tracker engine 324, the event-completion tracker engine 325, the transiency prediction engine 326, the other applications 327, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to the ingestion engine 322, the resolution tracker engine 324, the event-completion tracker engine 325, the transiency prediction engine 326, the other applications 327, may be provisioned and de-commissioned automatically.

In at least one of the various embodiments, the applications may be arranged to employ geo-location information to select one or more localization features, such as, time zones, languages, currencies, calendar formatting, or the like. Localization features may be used in user-interfaces and well as internal processes or databases. Further, in some embodiments, localization features may include information regarding culturally significant events or customs (e.g., local holidays, political events, or the like) In at least one of the various embodiments, geo-location information used for selecting localization information may be provided by the GPS transceiver 340. Also, in some embodiments, geolocation information may include information providing using one or more geolocation protocol over the networks, such as, the wireless network 110 or the network 111.

Also, in at least one of the various embodiments, the ingestion engine 322, the resolution tracker engine 324, the event-completion tracker engine 325, the transiency prediction engine 326, the other applications 327, or the like, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 360 may be a stand-alone network computer, in other cases, the HSM 360 may be arranged as a hardware card that may be installed in a network computer.

Additionally, in one or more embodiments (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
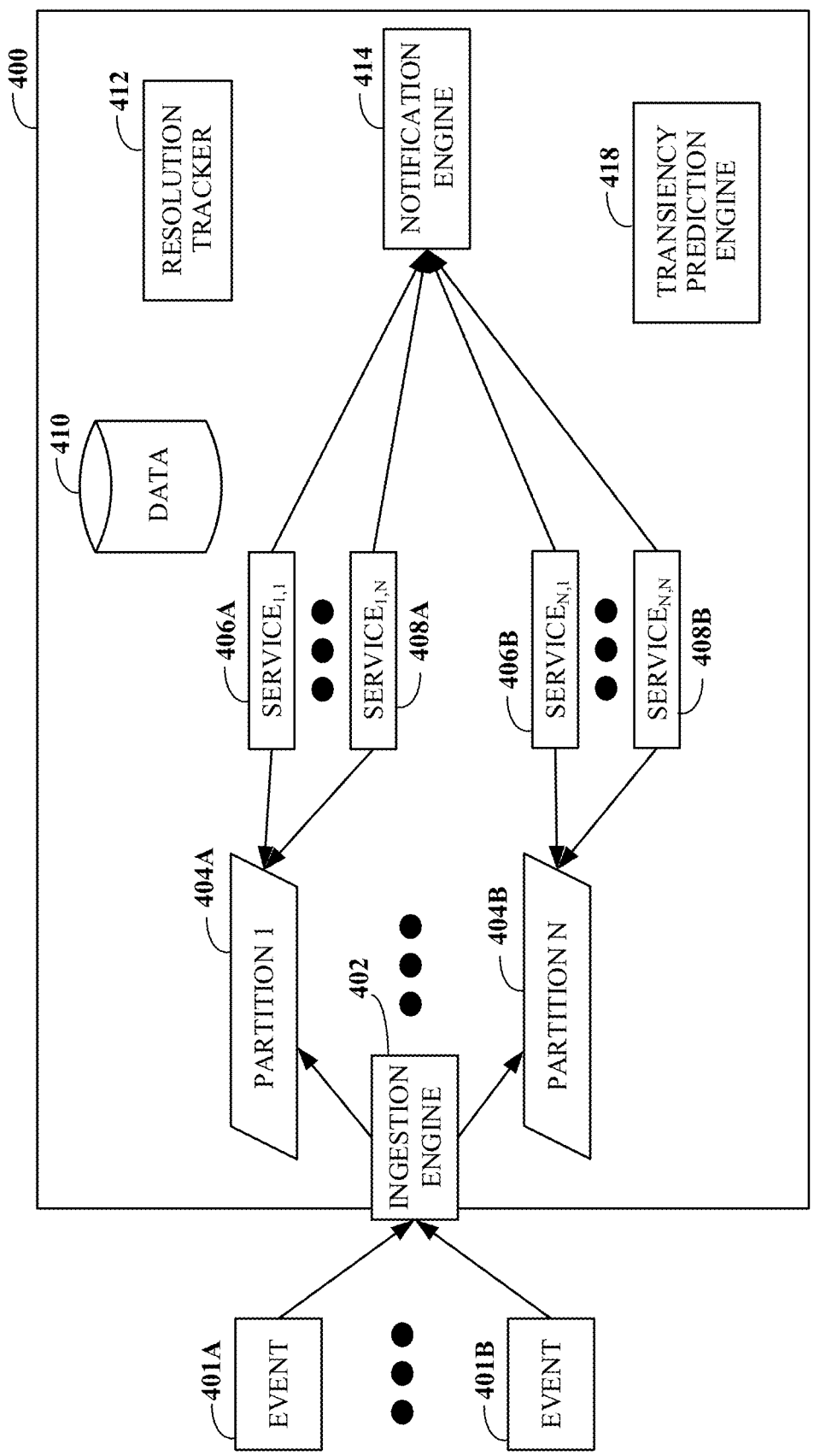
FIG. 4 illustrates a logical architecture of a system for auto-pausing incident notifications.

FIG. 4 illustrates a logical architecture of a system 400 for auto-pausing incident notifications. In at least one of the various embodiments, a system for auto-pausing incident notifications may include various components. In this example, the system 400 includes an ingestion engine 402, one or more partitions 404A-404B, one or more services 406A-406B and 408A-408B, a data store 410, a resolution tracker 412, a notification engine 414, and a transiency prediction engine 418.

One or more systems, such as monitoring systems, of one or more organizations may be configured to transmit events to the system 400 for processing. The system 400 may provide several services. A service may, for example, process an event into an actionable item (e.g., an incident). As mentioned above, a received event may trigger an alert, which may trigger an incident, which in turns causes notifications to be transmitted to responders.

A received event from an organization may include an indication of one or more services that are to operate on (e.g., process, etc.) the event. The indication of the service is referred to herein as a routing key. A routing key may be unique to a managed organization. As such, two events that are received from two different managed organizations for processing by a same service would include two different routing keys. A routing key may be unique to the service that is to receive and process an event. As such, two events associated with two different routing keys and received from the same managed organization for processing may be directed to (e.g., processed by) different services.

The ingestion engine 402 may be configured to receive or obtain one or more different types of events provided by various sources, here represented by events 401A, 401B. The ingestion engine 402 may accept or reject received events. In an example, events may be rejected when events are received at a rate that is higher than a configured event acceptance rate. If the ingestion engine 402 accepts an event, the ingestion engine 402 may place the event in a partition for further processing. If an event is rejected, the event is not placed in a partition for further processing. The ingestion engine may notify the sender of the event of whether the event was accepted or rejected. Grouping events into partitions can be used to enable parallel processing and/or scaling of the system 400 so that the system 400 can handle (e.g., process, etc.) more and more events and/or more and more organizations.

The ingestion engine 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion engine 402 may be arranged to normalize incoming events into a unified common event format. Accordingly, in some embodiments, the ingestion engine 402 may be arranged to employ configuration information, including, rules, templates, maps, dictionaries, or the like, or combination thereof, to normalize the fields and values of incoming events to the common event format. The ingestion engine 402 may assign (e.g., associate, etc.) an ingested timestamp with an accepted event.

In at least one of the various embodiments, an event may be stored in a partition, such as one of the partition 404A or the partition 404B. A partition can be, or can be thought of, as a queue (i.e., a first-in-first-out queue) of events. FIG. 4 is shown as including two partitions (i.e., the partitions 404A and 404B). However, the disclosure is not so limited and the system 400 can include one or more than two partitions.

In an example, different services of the system 400 may be configured to operate on events of the different partitions. In an example, the same services (e.g., identical logic) may be configured to operate on the accepted events in different partitions. To illustrate, in FIG. 4, the services 406A and 408A process the events of the partition 404A, and the services 406B and 408B process the events of partition the 404B, where the service 406A and the service 406B execute the same logic (e.g., perform the same operations) of a first service but on different physical or virtual servers; and the service 408A and the service 408B execute the same logic of a second service but on different physical or virtual servers. In an example, different types of events may be routed to different partitions. As such, each of the services 406A-406-B and 408A-408B may perform different logic as appropriate for the events processed by the service.

An (e.g., each) event, may also be associated with one or more services that may be responsible for processing the events. As such, an event can be said to be addressed or targeted to the one or more services that are to process the event. As mentioned above, an event can include or can be associated with a routing key that indicates the one or more services that are to receive the event for processing.

Events may be variously formatted messages that reflect the occurrence of events or incidents that have occurred in the computing systems or infrastructures of one or more managed organizations. Such events may include facts regarding system errors, warning, failure reports, customer service requests, status messages, or the like. One or more external services, at least some of which may be monitoring services, may collect events and provide the events to the system 400. Events as described above may be comprised of, or transmitted to the system 400 via, SMS messages, HTTP requests/posts, API calls, log file entries, trouble tickets, emails, or the like. An event may include associated information, such as, source, a creation time stamp, a status indicator, more information, fewer information, other information, or a combination thereof, that may be tracked.

In at least one of the various embodiments, a data store 410 may be arranged to store performance metrics, configuration information, or the like, for the system 400. In an example, the data store 410 may be implemented as one or more relational database management systems, one or more object databases, one or more XML databases, one or more operating system files, one or more unstructured data databases, one or more synchronous or asynchronous event or data buses that may use stream processing, one or more other suitable non-transient storage mechanisms, or a combination thereof.

Data related to events, alerts, incidents, notifications, other types of objects, or a combination thereof may be stored in the data store 410. For example, the data store 410 can include data related to resolved and unresolved alerts. For example, the data store 410 can include data identifying whether alerts are or not acknowledged. For example, with respect to a resolved alert, the data store 410 can include information regarding the resolving entity that resolved the alert (and/or, equivalently, the resolving entity of the event that triggered the alert), the duration that the alert was active until it was resolved, other information, or a combination thereof. The resolving entity can be a responder (e.g., a human). The resolving entity can be an integration (e.g., automated system), which can indicate that the alert was auto-resolved. That the alert is auto-resolved can mean that the system 400 received, such as from the integration, an event indicating that a previous event, which triggered the alert, is resolved. The integration may be a monitoring system.

In at least one of the various embodiments, the resolution tracker 412 may be arranged to monitor the details regarding how events, alerts, incidents, other objects received, created, managed by the system 400, or a combination thereof are resolved. In some embodiments, this may include tracking incident and/or alert life-cycle metrics related to the events (e.g., creation time, acknowledgement time(s), resolution time, processing time,), the resources that are/were responsible for resolving the events, the resources (e.g., the responder or the automated process) that resolved alerts, and so on. The resolution tracker 412 can receive data from the different services that process events, alerts, or incidents. Receiving data from a service by the resolution tracker 412 encompasses receiving data directly from the service and/or accessing (e.g., polling for, querying for, asynchronously being notified of, etc.) data generated (e.g., set, assigned, calculated by, stored, etc.) by the service. The resolution tracker can receive (e.g., query for, read, etc.) data from the data store 410. The resolution tracker can write (e.g., update, etc.) data in the data store 410. While FIG. 4 is shown as including one resolution tracker 412, the disclosure herein is not so limited and the system 400 can include more than one resolution tracker. In an example, different resolution trackers may be configured to receive data from services of one or more partitions. In an example, each partition may have associated with one resolution tracker. Other configurations or mappings between partitions, services, and resolution trackers are possible.

The notification engine 414 may be arranged to generate notification messages for at least some of the accepted events. The notification messages may be transmitted to responders (e.g., responsible users, teams) or automated systems. The notification engine 414 may select a messaging provider that may be used to deliver a notification message to the responsible resource. The notification engine 414 may determine which resource is responsible for handling the event message and may generate one or more notification messages and determine particular message providers to use to send the notification message.

In at least one of the various embodiments, a scheduler (not shown) may determine which responder is responsible for handling an incident based on at least an on-call schedule and/or the content of the incident. The notification engine 414 may generate one or more notification messages and determine a particular message providers to use to send the notification message. Accordingly, the selected message providers may transmit (e.g., communicate, etc.) the notification message to the responder. Transmitting a notification to a responder, as used herein, and unless the context indicates otherwise, encompasses transmitting the notification to a team or a group. In some embodiments, the message providers may generate an acknowledgment message that may be provided to system 400 indicating a delivery status of the notification message (e.g., successful or failed delivery).

In at least one of the various embodiments, the notification engine 414 may determine the message provider based on a variety of considerations, such as, geography, reliability, quality-of-service, user/customer preference, type of notification message (e.g., SMS or Push Notification, or the like), cost of delivery, or the like, or combination thereof. In at least one of the various embodiments, various performance characteristics of each message provider may be stored and/or associated with a corresponding provider performance profile. Provider performance profiles may be arranged to represent the various metrics that may be measured for a provider. Also, provider profiles may include preference values and/or weight values that may be configured rather than measured, In at least one of the various embodiments, the system 400 may include various user-interfaces or configuration information (not shown) that enable organizations to establish how events should be resolved. Accordingly, an organization may define, rules, conditions, priority levels, notification rules, escalation rules, routing keys, or the like, or combination thereof, that may be associated with different types of events. For example, some events may be informational rather than associated with a critical failure. Accordingly, an organization may establish different rules or other handling mechanics for the different types of events. For example, in some embodiments, critical events may require immediate (e.g., within the target lag time) notification of a response user to resolve the underlying cause of the event. In other cases, the events may simply be recorded for future analysis. For example, an organization may configure one or more services to auto-pause incident notifications (or, equivalently, to auto-pause alerts).

At least one of the services 406A-406B and 408A-408B may be configured to trigger alerts. At least one of the services configured to trigger alerts may be configured to auto-pause alerts. As mentioned, auto-pausing an alert can mean suspending the alert for a pause period such that if the alert resolves (such as without human intervention) in the pause period, the alert does not trigger an incident and notifications are not transmitted to responders. On the other hand, if the alert does not auto-resolve during the pause period, then the service can trigger an incident, which in turn can cause notifications to be transmitted to one or more responders.

The transiency prediction engine 418 determines whether an alert is likely to be transient. A service, or another component, of the system 400 may (directly or indirectly) use the transiency prediction engine 418 to determine whether to pause an alert or whether to proceed with triggering an incident for the alert. In an example, output of the transiency prediction engine 418 can be used to associate data (e.g., metadata, attributes, etc.) with an alert to indicate whether the alert is to be paused or not. Prior to a step that may trigger an incident for the alert, the transiency prediction engine 418 may set, or another component of the system 400 may use the output of the transiency prediction engine 418 to set, the associated data and the alert may be paused according to the associated data. Other ways of using the transiency prediction engine 418 to auto-pause (e.g., suspend) an alert are possible. The transiency prediction engine 418 is further described with respect to FIG. 5.

Figure 5:
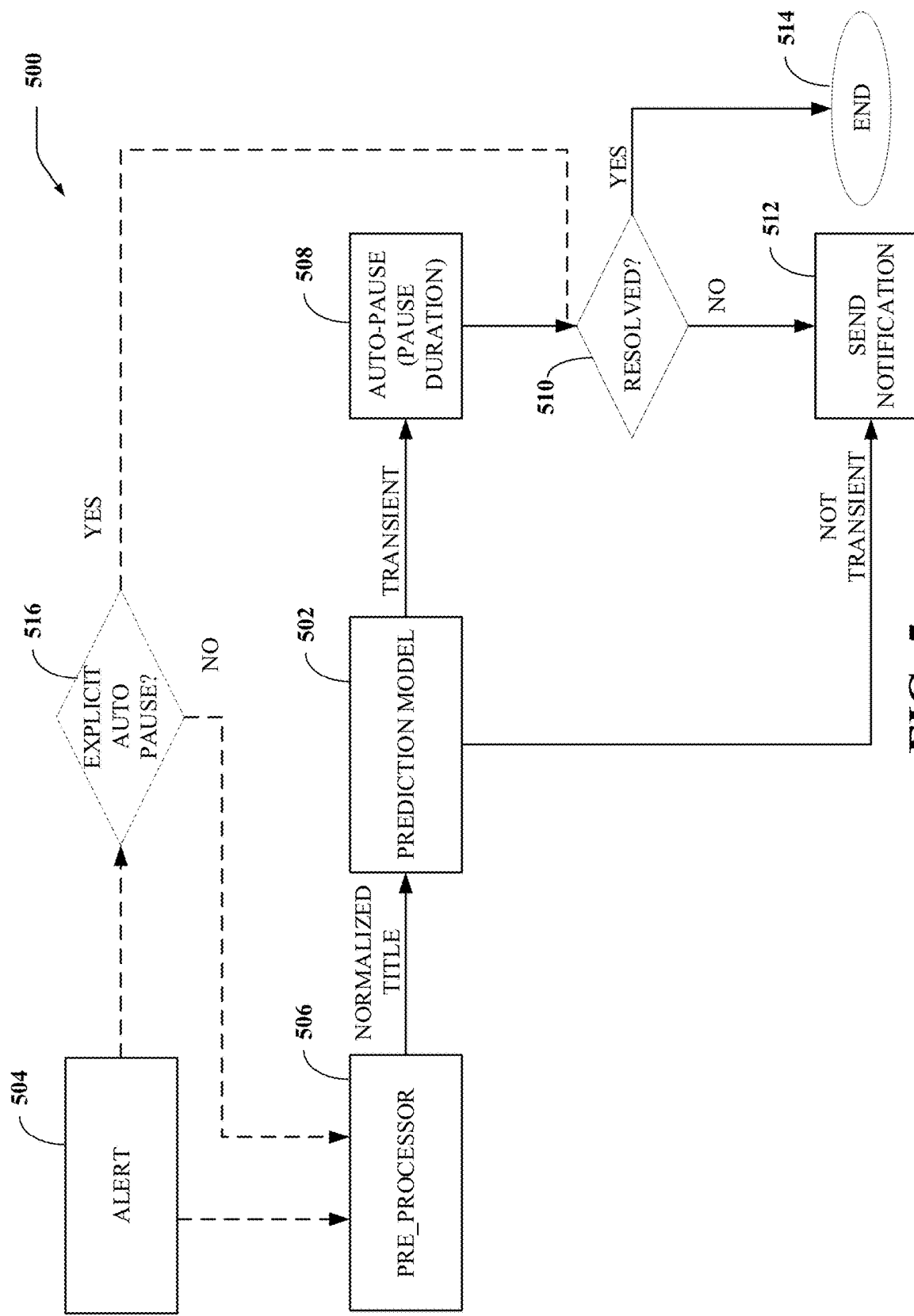
FIG. 5 is a flowchart of an example of technique for auto-pausing alerts.

FIG. 5 is a flowchart of an example of technique 500 for auto-pausing alerts. The technique 500 may be implemented in the system 400 of FIG. 4. The technique 500 includes a prediction model 502, which can be, can be included in, or can be implemented by the transiency prediction engine 418 of FIG. 4. The prediction model 502 receives a normalized title of an alert and outputs a prediction as to whether the alert is a transient alert. Each alert can have an associated title. The title may be or may be derived from the event associated with the alert. As further described below, the prediction model 502 uses historical data (i.e., previously resolved alerts) to predict whether the alert 504 is likely to be transient. While the description herein uses an attribute of an alert that may be named "title" and refers to a "normalized title," the disclosure is not so limited. Broadly, a title can be any attribute, metadata, or the like that may be associated with an alert and from which a corresponding normalized string can be obtained. As such, the prediction model 502 can determine (e.g., output, infer, derive, etc.) a type of the alert where the type can be or can indicate whether the alert is of a likely transient type. That the alert is of a likely transient type can equivalently mean that the alert is likely transient.

In an example, the prediction model may output a binary value indicating whether the alert is predicted to be transient. For example, an output of 1 may indicate that the alert is predicted to be transient and an output of 0 may indicate that the alert is not predicted to be transient. In an example, the output of the prediction model can be a value in the range [0, 1]. If the output is greater than a threshold value, the alert can be predicted to be transient; otherwise the alert is predicted to not be transient.

An alert 504, or more specifically, a title of alert 504, may be processed by a pre-processor 506, which may be a component of the system 400 of FIG. 4, to obtain a normalized title. The normalized title may be associated with the alert. The normalized title is then input to the prediction model 502. By normalizing alert titles, similar alerts can be identified. In an example, the pre-processor 506 can be implemented by, or can be a part of, the transiency prediction engine 418 of FIG. 4. In an example, the pre-processor can be implemented by, or can be a part of, an ingestion engine, such as the ingestion engine 402 of FIG. 4.

If the alert is predicted to be transient, the technique 500 proceeds to 508. If the alert is not predicted to be transient, the technique 500 proceeds to 512. At 508, the alert is paused for a pause duration. At or after the pause duration lapses, the technique 500 determines, at 510, whether the alert is resolved. If the alert is resolved, the technique 500 ends at 514 and no notifications are transmitted to any responders. On the other hand, if the alert is not resolved, at 512, the technique 500 sends a notification to a responder. Sending the notification can include triggering an incident and transmitting the notification relating to or regarding the incident.

The pause duration may be a preset (e.g., predetermined) pause duration (e.g., 1 minute, 2 minutes, 10 minutes, or some other pause duration). In an example, a pause duration may be associated with a routing key. In an example, a pause duration may be associated with a managed organization. As such, all paused alerts triggered by events from the same managed organization are paused for the same pause duration. In an example, pause durations may be associated with normalized alert titles. In an example, at least some normalized titles may have associated respective pause durations. For example, the resolution times (e.g., the time that an alert was resolved minus the time that the alert was triggered) of the alerts used to obtain a normalized template of the prediction model 502 can be used to obtain (e.g., set, calculate, determine, select, etc.) the respective pause duration (i.e., calculated pause duration). In an example, an average of the resolution times can be used. In an example, the average resolution time plus a standard deviation for the time resolution times can be used. Some other function of the resolution times can be used. In an example, the respective pause duration of a normalized alert template can be a function (e.g., min, max, or some other function) of the calculated pause duration and the preset pause duration.

Any number of techniques can be used to pause the alert 504. In an example, a timer of a duration that is equal to the pause duration may be started responsive to the alert 504 being predicted as transient. At or after the expiration of the timer, the technique 500 proceeds to 510. In another example, paused alerts may be placed in a queue according to (e.g., sorted by) their pause duration expiration time. The technique 500 (or some other asynchronous process) may regularly examine the queue to determine whether pause durations of any of the queued paused alerts have lapsed. Other ways of pausing and continuing the processing of paused events after the lapse of their respective pause durations are possible. A status (e.g., metadata) can be associated with an alert to indicate that the alert is paused. In an example, the status can be or can indicate that the alert is "suspended" or "paused."

In some examples, the system 400 of FIG. 4 may provide a facility (e.g., tools, capabilities, user interfaces, etc.) that can be used, such as by an administrator of a managed organization, to create rules (e.g., configurations) for pausing certain alerts. As such, the administrator can provide explicit rules for pausing certain alerts or alerts meeting certain criteria. The administrator may also provide an explicit pause duration (which may be a default explicit pause duration).

In such a case, the alert 504 may first be transmitted to 516 (instead of 506) to determine whether to pause the alert based on explicit rules to pause the alert. If an explicit rule exists for pausing the alert, the alert is paused according to the explicit pause duration and the technique 500 proceeds to 510. If an explicit rule for pausing the alert does not exist, then the technique 500 proceeds to 506.

Referring again to the pre-processor 506. The pre-processor 506 may apply any number of text processing (e.g., manipulation) rules to the title of the alert to obtain the normalized alert. It is noted that the title of the alert is not itself changed as a result of the text processing rules. As such, stating that a rule X is applied to the title of the alert, or any such similar statements, should be understood to mean that the rule X is applied to a copy of the title of the alert. The text processing rules are intended to generalize alert titles for comparison and matching purposes.

To illustrate, and without limitations, assume that a first alert has a first title of "CRITICAL—code 10—Nodejs on 10.168.10.2 unavailable for http://www.server.com/service1" and a second alert has a second title of "CRITICAL—code 23—Nodejs on 132.68.145.12 unavailable for https://internal.sl.com/index.html". The first and the second titles do not match without further text processing. However, as further described herein, the first and the second titles may be normalized to the same normalized title "critical code x nodejs on ip unavailable for uri." As such, for purposes of predicting transiency, the first alert and the second alert can be considered to be similar or equivalent.

Table I illustrates examples of the text processing rules that may be applied to an alert title to obtain a normalized title. In some implementations, more, fewer, other rules, or a combination thereof may be applied. In an example, the rules may be applied in a predefined order. For example, the rules of Table I may be applied in the order listed in Table I. However, it is noted that in the following explanation of the rules of Table I, each rule is considered in isolation and independently of any other rules.

TABLE I

| Order | Rule |
|---|---|
| 1 | Remove any newlines, and tab spaces and split alert summaries on white spaces. |
| 2 | Replace date, datetime, and time strings with a placeholder token (e.g., "datetime"). |
| 3 | Replace identifiers with representative tokens. |
| 4 | Replace camel casing with spaces. |
| 5 | Replace numeric characters with a placeholder token (e.g. "X"). |
| 6 | Convert the title to a single case. |
| 7 | Replace email addresses with a placeholder token (e.g., "email_adr"). |
| 8 | Replace punctuation characters with spaces. |
| 9 | Replace multiple consecutive white spaces with a single whitespace. |

Rule 1, when applied to an alert title, removes any new lines, table spaces, and the like, and replaces multiple consecutive white spaces with a single whitespace. Rule 2, when applied to an alert title, identifies any substring that may indicate a time (e.g., a date, a timestamp, a date and time) and replaces the time with the token (e.g., string) "datetime." For example, given the title "Jan. 31, 2021 10:35:34—Service unavailable," rule 2 results in the normalized title "datetime—Service unavailable." Rule 3 identifies special identifiers in the alert title and replaces the identifiers with respective representative tokens. To illustrate, and without limitations, Rule 3 may identify, in an alert title, a substring (e.g., an identifier) as a universally unique identifier (UUID), a globally unique identifier (GUID), an Internet Protocol (IP) address, or a Uniform Resource Locator (URL) and replaces such identifiers with the representative tokens "uuid," "uuid," "ip_addr," or "url," respectively. For example, given the alert title "sparkline-replay-pixel_10_108_91_19 expired," rule 3 obtains the normalized title "sparkline-replay-pixel_ip_addr expired."

Rule 4, when applied to an alert title, converts camel casing to spaces. Camel casing refers to writing phrases without spaces or punctuation and indicating the separation of words with a single capitalized letter. For example, given the alert title "Sum RunningTaskCount LessThan 3.0," rule 4 may obtain the normalized title "Sum Running Task Count Less Than 3.0."

Rule 5, when applied to an alert title, replaces a numeric substring with a uniform non-numeric substring of the same length as the numeric substring. As such, rule 5 removes numbers while maintaining the length of the alert title. For example, given the alert title "HTTP error 504," rule 5 obtains the normalized title "HTTP error XXX." In another variation of rule 5, a numeric substring may be replaced with a single predetermined, non-numeric character. As such, the normalized title "HTTP error X" may instead be obtained.

Rule 6, when applied to an alert title, converts the alert to a single case (e.g., one of capital letters or lower case letters). For example, given the alert title "Sum Running Task Count LESS THAN 3.0," rule 6 may be applied to convert the title to the lower case title "sum running task count less than 3.0." Rule 7, when applied to an alert title, replaces email addresses with a placeholder token, such as the token "email_adr." For example, given the alert title "unknown 552 <jack@example.com> Mailbox full," rule 7 obtains the normalized title "unknown 552 email_adr Mailbox full."

Rule 8, when applied to an alert title, replaces punctuation characters (e.g., underscores, square brackets, plus signs, question marks, parentheses, curly brackets, semi-colons, commas, periods, question marks, etc., or a subset thereof) with spaces. For example, given the alert title "kubernetes—Watchdog [prod-westus]," rule 8 obtains the normalized alert title "kubernetes Watchdog prod westus." Rule 9 replaces multiple consecutive white spaces with a single whitespace character and removes any leading or trailing white spaces. For example, given the string "kubernetes  Watchdog prod westus," rule 9 obtains the normalized title "kubernetes Watchdog prod westus."

The rules of Table I may be implemented in any number of ways. For example, each of the rules may be implemented as a respective set of computer executable instructions (e.g., a program, etc.) that carries out the function of the rule. At least some of the rules may be implemented using pattern matching and substitution, such as using regular expression matching and substitution. Other implementations are possible.

Referring again to the prediction model 502. In an example, the prediction model 502 can be, can be implemented as, or can be implemented using a prediction table. The prediction table can be constructed using historical resolved alerts data (i.e., historical data). As mentioned, in an example, the historical data may be stored in the data store 410 of FIG. 4. In an example, the selected historical alerts can include alerts resolved during a history period (e.g., the last 60 days from the time that the historical data are obtained or queried for, or some other history period). The prediction table can be retrained (e.g., reconstructed to reflect recent history) on a regular basis, such as hourly, daily, weekly, or at some other frequency.

To train the prediction table, each of the alerts of the historical data can be labeled as "transient" or "non-transient" depending on whether the alert meets transiency criteria. In an example, the transiency criteria can include that the alert was resolved within a specified resolution time duration (e.g., 5 minutes) and that the alert was resolved by a non-responder. That the alert is resolved by a non-responder can mean that no responder explicitly indicated (such as using an interface of the system 400 of FIG. 4) that the responder resolved the alert, that an event was received by the system 400 indicating that the alert was resolved (e.g., was automatically resolved), or some other way that indicates that the alert was not resolved by a responder. In an example, the transiency criteria can include that the alert was resolved within a specified resolution time duration (e.g., 5 minutes) and that no notification corresponding or related to the alert was transmitted. Other transiency criteria are possible.

The titles of the historical data can then be normalized, such as described with respect to the pre-processor 506. In an example, normalized titles may be associated with alerts at the time that the alert object is created (e.g., triggered). The prediction table can then be obtained from the alert labels and the normalized titles. For each normalized title, the prediction table can include a prediction value (i.e., a transient ratio) for whether an alert whose title normalizes to the normalized title should be classified as transient or non-transient. More broadly, respective transient ratios can be associated with alert types (e.g., categories). The type of an alert can be or can be indicated by the normalized title of the alert. The transiency criteria, the history period, or both may be changed when the prediction model is retrained.

To illustrate, if the historical data includes 100 occurrences of the normalized alert tile "xxx email_adr mailbox full" and 85 of the 100 occurrences correspond to alerts that were classified as transient, then the transient ratio for the normalized title would be 0.85. In an example, the transient ratio associated to a normalized title may be set to zero in the prediction table when the historical data does not include a minimum number of occurrences of the normalized title. That is, an alert is not predicted as transient when there aren't sufficient historical data to base a prediction on. To illustrate, assume that the minimum number of occurrences is set to 150. As such, the prediction ratio associated with the normalized alert tile "xxx email_adr mailbox full" would be set to zero in the prediction table as the normalized title appears only 100 times, which is less than the required minimum number of occurrences (i.e., 150).

During inferencing (i.e., to predict whether an alert is transient or non-transient for the purpose of determining whether to pause or not pause the alert, respectively), the transient ratio (p) corresponding to the normalized title of the alert can be obtained from the prediction table. If the transient ratio (p) is greater than a threshold (t), the alert is predicted to be transient and is paused; otherwise, the alert is predicted to be non-transient and is, thus, not paused. As such, the prediction table predicts that an alert is transient if there are at least a minimum number of occurrences of the normalized title of the alert in the prediction table and a threshold number of those occurrences are transient (i.e., $p \geq t$).

The threshold value (t) can be selected so as to balance precision and recall. While recall expresses the ability to find all relevant instances (e.g., the prediction model identifies as transient alerts) in a data set, precision expresses the proportion of the data points the prediction model identifies as relevant that are actually relevant (e.g., alerts that are in fact transient).

Precision can be generally defined as the number of true positives (TP) divided by the number of true positives (TP) plus the number of false positives (FP); and recall can be generally defined as the number of true positives (TP) divided by the number of true positives (TP) plus the number of false negatives (FN). A true positive (TP) is an alert classified by the prediction model as transient and that is in fact transient. A false positive (FP) is an alert that the prediction model incorrectly labels as transient that is in fact not transient. A false negative (FN) is an alert that the prediction model is an alert that the prediction model incorrectly labels as non-transient that is in fact transient.

$$\text{precision} = \frac{TP}{TP+FP} = \frac{\text{transient alerts identified correctly}}{\text{transient alerts identified correctly} + \text{non transient alerts incorrectly labelled as transient}}$$

$$\text{recall} = \frac{TP}{TP+FN} = \text{transient alerts identified correctly} -$$

$$(\text{transient alerts identified correctly} + \text{transient alerts incorrectly labelled as non transient})$$

On the one hand, it is desirable for the prediction model to correctly identify as many incoming transient alerts as transient. As such, a trade-off between precision and recall depends on how aggressive or conservative the predictions of the prediction model are. An aggressive prediction model would identify almost all transient alerts correctly. However, in doing so, the prediction model may also generate many false positives. On the other hand a conservative prediction model would be stricter when predicting transient alerts, which in turn leads to higher false negatives. To reduce noise, it is desirable for the prediction model to correctly identify (e.g., predict, classify) as transient as many incoming alerts that are actually transient as possible. If an alert is actually transient, it is desirable for the prediction model to not wrongly predict the alert as non-transient. As such, it is desirable for the prediction model to reduce false negatives. In other words, an aggressive model that is optimized for high recall is desirable.

On the other hand, it is desirable not to delay an alert (by pausing the alert) if the alert is in fact not transient. As such, the prediction model should predict that an alert is transient only if the prediction model has a high degree of confidence that the alert is in fact transient. When the prediction model correctly predicts transient alerts as transient, these alerts would then be delayed by the pause duration. When the prediction model wrongly predicts a non-transient alert as transient (false positive), that alert will also be delayed by pause duration. This can create an issue, especially if the pause duration is large and the alert was triggered due to a major or crucial event. Hence, it is desirable to minimize the false positives generated by the prediction model especially if the pause duration is large enough to be significant. As such, a prediction model with high precision is desirable.

As such, the threshold value for a prediction model can be set (e.g., configured) according to a desirable pausing policy. For example, one policy may be summarized as "do not pause alerts that may not be transient." As such, a very high threshold (e.g., 85%, 90%, or some other very high threshold) can be set, which may result in not predicting an alert as transient when in fact it is. On the other hand, with such a very high threshold, the prediction model may result in never (or almost never) pausing a non-transient alert. For example, another policy may be summarized as "it is OK to pause non-transient alerts, such as for 3-5 minutes, in order to reduce overall noise." As such, a fairly low threshold (e.g., 20%, 30%, or some other low threshold) can be set, which may result is pausing alerts that are not in fact transient.

In another example, the prediction model 502 can be, can be implemented as, or can be implemented using a rolling table. In real time (i.e., as alerts are resolved), the rolling table can be updated to track a last predetermined number (X) of alerts, how long those alerts took to resolve, and how those alerts were resolved (i.e., by a responder, automatically by an integration, etc.). As described above with respect to the prediction table, the rolling table can also be constructed using normalized alert titles.

During inferencing (i.e., to predict whether an alert is transient or non-transient for the purpose of determining whether to pause or not pause the alert, respectively), when a new alert is created, if a minimum number (Y) of the previous last predetermined number (X) matching the normalized title of the alert were transient, then the alert may be classified as transient. The variables (X, Y) can be changed quickly and easily depending on how they perform, such as by examining transiency predictions as compared to ground truth data (i.e., how the alerts actually resolved). To illustrate, the prediction model 502 may be configured to require that 2 of the last 2 alerts were transient to predict that the next alert would be predicted to be transient as well; the configuration may later change to require 8 out of the last 10 be actually transient.

In an implementation, the rolling table can be configured with minimum thresholds (i.e., small X and Y values) for new alert types (i.e., for new normalized alert titles). For example, when a new normalized alert title is first encountered, (X, Y) may be set to (2, 2). For example, if new alerts are being encountered and the alerts are noisy (e.g., many instances of the alerts are being triggered), (X, Y) can be configured to pause such alerts more quickly, such as by setting low (X, Y) values. As similar alerts are resolved, the (X, Y) values can be changed in real time based on the ground truth (i.e., actual) alert resolution data. To illustrate, if an alert is switching from transient to non-transient, the rolling table model can be changed (e.g., configured) so that the alerts are not paused.

As can be appreciated, a prediction table may not as frequently change with changing circumstances as compared to a rolling table. That is, the prediction table does not reflect recent realities (i.e., alert data) until the prediction table is retrained. On the other hand, the prediction table can provide predictable prediction behavior until it is retrained. Contrastingly, a rolling table incorporates new data as alerts are resolved. As such, the rolling table changes with the circumstances. On the other hand, the rolling table can result in prediction behaviors that frequently change.

In an example, the prediction model 502 can be, can be implemented as, or can be implemented using a machine learning (ML) model. The prediction table model and, at least to some extent, the rolling table model may not be tolerant to new data. Such models operate on or require exact matches of normalized alerts titles. On the other hand an ML model can be tolerant to new data and may be able to classify an alert as transient or not based on a similarity, which may not be an exact match, between the normalized alert title and other normalized titles used to train the ML model. As such, an ML model can obtain better (e.g. higher) coverage than the prediction table or the rolling table. Any number of ML models (such as random forest, logistic regression, etc.) may be used.

The ML model can be implemented (e.g., trained) using natural language processing techniques. For example, alert titles may be normalized to obtain normalized titles. The normalized titles can be tokenized, cleaned, and vectorized. As is known, tokenizing can split the normalized title into words and/or groups of groups (collectively, n-grams), typically using special characters and/or white spaces to identify the n-grams. Cleaning (e.g., normalizing) the words of the normalized title, which may be performed before or after the tokenizing, can include zero or more of stemming, removing stop words (e.g., very common, words that do not add value to the title) from the word vector, other steps, or a combination thereof. Vectorizing can mean converting the n-grams into respective vector representations of numbers based on all the words identified in the training dataset (i.e., all words of the normalized titles used for training the ML model). Any number of techniques can be used to vectorize the word vector, such as count vectorization, n-gram selection, term frequency—inverse document frequency (TFIDF), or other techniques.

While, for simplicity of explanation, one prediction model is described herein, the disclosure is not so limited and multiple prediction models can be available. For example, a respective prediction model 502 can be available for one or more services, for one or more routing keys, or for one or more managed organizations. As such, for example, a prediction model for a routing key can be constructed using historical resolved alert data where the resolved alerts correspond to or are triggered from the service of the routing key. In an example, different criteria can be used to obtain the historical data. To illustrate, and without limitations, whereas one prediction model may be obtained using a first specified resolution time duration (e.g., 5 minutes), another prediction model may be obtained using a second specified resolution time duration (e.g., 10 minutes). In an example, the specified resolution time durations used may be set according to preferences of a managed organization. In an example, a specified resolution time duration may be based on analysis of the historical data used to obtain the prediction model. Other ways of setting or obtaining a specified resolution time duration are possible.

Figure 6:
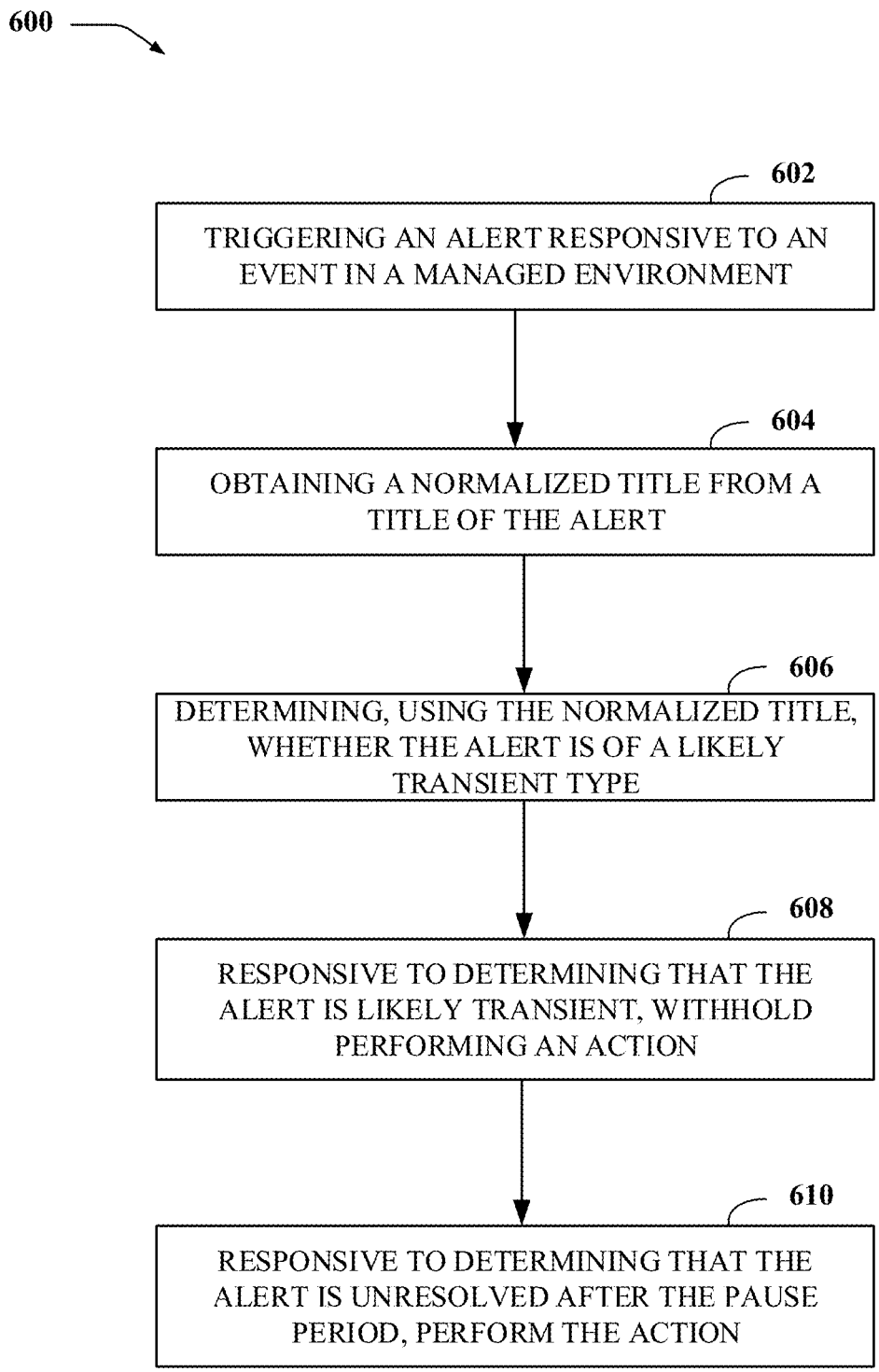
FIG. 6 is a flowchart of an example of a technique for pausing alert notifications.

FIG. 6 is a flowchart of an example of a technique 600 for pausing alert notifications. The technique 600 can be implemented in or by an EMB, such as the system 400 of FIG. 4. The technique 600 may be implemented in whole or in part in or by the ingestion engine 402, one or more of the services 406A-406B and 408A-408B, or the transiency prediction engine 418 of the system 400 of FIG. 4. The technique 600 can be implemented, for example, as a software program that may be executed by computing devices such as the network computer 300 of FIG. 3. The software program can include machine-readable instructions that may be stored in a memory (e.g., a non-transitory computer readable medium), such as the memory 304, the processor-readable stationary storage device 334, or the processor-readable removable storage device 336 of FIG. 3, and that, when executed by a processor, such as the processor 302 of FIG. 3, may cause the computing device to perform the technique 600. The technique 600 can be implemented using specialized hardware or firmware. Multiple processors, memories, or both, may be used.

At 602, the technique 600 triggers an alert responsive to an event in a managed environment. Triggering an event can mean creating an alert object, or the like, corresponding to the event. At 604, the technique 600 obtains a normalized title from a title of the alert. The alert object can include an attribute that may specifically be named "title." Alternatively, any attribute or combination of attributes of the alert can be used to obtain a normalized string, as described herein, may be referred to or considered to be the title of the alert.

Obtaining the normalized title from the title of the alert can include applying one or more rules, as described with respect to the FIG. 5, to the title to obtain the normalized title. In an example, obtaining the normalized title from the title of the alert can include replacing each identifier in the title with a respective representative token and replacing each number of a numeric string of the title with a first predefined character. In an example, obtaining the normalized title from the title of the alert can further include applying at least one removing newlines from the title, removing tab characters from the title, converting the title to a single case, and replacing at least some punctuation characters with a second predefined character.

At 606, the technique 600 determines, using the normalized title, whether the alert is of a likely transient type, as described above. Stated another way, the technique 600 can determine whether the alert is of a likely transient type. A transient alert (i.e., an alert that is of the likely transient type) can be one that resolves without human intervention. In an example, and as described above, the alert can be determined to be likely transient (i.e., of the likely transient type) using a rolling table such that the alert is identified as transient responsive to identifying that 1) a first number of most recently resolved alerts matching the normalized title is greater than a predetermined minimum number and 2) at least a predetermined second number of the most recently resolved alerts were transient where the predetermined minimum number is greater than the predetermined second number.

In an example, and as described above, the alert can be determined to be of the likely transient type using a prediction table such that the alert is identified as transient responsive to identifying that, of resolved alerts matching the normalized title within a history period, at least a threshold number of the resolved alerts were identified as transient. In an example, a number of the resolved alerts matching must exceed a predetermined minimum number.

In another example, and as described above, the alert can be determined to be of the likely transient type using a machine learning model that takes as input a vectorized normalized title derived from the normalized title.

At 608, the technique 600 withholds performance of an action for a pause period. At 610, the technique 600 performs the action responsive to determining that the alert is unresolved after the pause period lapses. In an example, the action can be to notify some responder of the alert. As such, in an example, the technique the technique 600 withholds transmission of notifications for the alert during the pause period responsive to determining that the alert is likely transient; and, responsive to determining that the alert is unresolved after the pause period (e.g., the pause period lapses), the technique 600 transmits a notification for the alert to (e.g., notifies, etc.) a responder of the alert.

Figure 7:
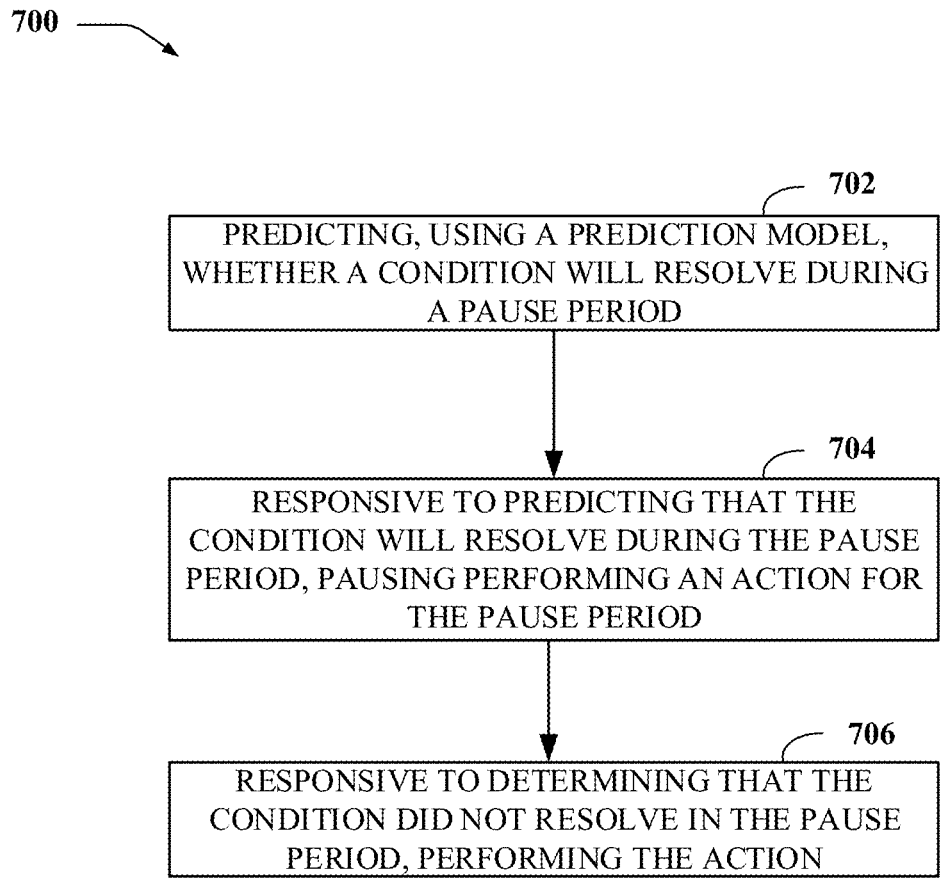
FIG. 7 is a flowchart of an example of a technique for pausing performance of an action.

FIG. 7 is a flowchart of an example of a technique 700 for pausing performance of an action. The technique 700 can be implemented in or by an EMB, such as the system 400 of FIG. 4. The technique 700 may be implemented in whole or in part in or by the ingestion engine 402, one or more of the services 406A-406B and 408A-408B, or the transiency prediction engine 418 of the system 400 of FIG. 4. The technique 700 can be implemented, for example, as a software program that may be executed by computing devices, such as the network computer 300 of FIG. 3. The software program can include machine-readable instructions that may be stored in a memory (e.g., a non-transitory computer readable medium), such as the memory 304, the processor-readable stationary storage device 334, or the processor-readable removable storage device 336 of FIG. 6, and that, when executed by a processor, such as the processor 302 of FIG. 3, may cause the computing device to perform the processor 302. The technique 700 can be implemented using specialized hardware or firmware. Multiple processors, memories, or both, may be used.

At 702, the technique 700 predicts, using a prediction model, whether a condition will resolve during a pause period. The condition can relate to an event in a managed environment, a current condition in the managed environment, or the like. Typically, conditions require respective actions to be taken. In an example, the action to be taken can be the transmission of a notification about the condition. More broadly, the action can be any processing to be performed in response to the condition. However, performing the action may be wasteful if the condition is transient (e.g., temporary).

As such, at 704, responsive to predicting that the condition will resolve during the pause period, the technique 700 pauses performing the action for the pause period. At 706, responsive to determining that the condition did not resolve in the pause period, the technique 700 performs the action.

In an example, the condition can be predicted to resolve during the pause period using a rolling table such that the condition is predicted to resolve during the pause period responsive to identifying that 1) a first number of most recently resolved conditions matching the condition is greater than a predetermined minimum number and 2) at least a predetermined second number of the most recently resolved conditions resolved within the pause period. As described above, the condition can be that an alert or a situation in a managed environment resolved without human intervention. In an example, responsive to a status change with respect to the condition, the technique 700 updates the rolling table. For example, as described above, new data (e.g., alert data, data related to the condition) are incorporated into the rolling table as the data becomes available. As such, responsive to a status change with respect to the condition (e.g., an alert is actually resolved), the technique 700 updates the rolling table.

In an example, the condition can be predicted to resolve during the pause period using a prediction table such that the condition is predicted to resolve within the pause period responsive to identifying that, of resolved conditions matching the condition within a history period, at least a threshold number of the resolved conditions resolved within the pause period. In an example, a number of resolved conditions matching the condition within the history period has to exceed a predetermined minimum number.

For simplicity of explanation, the techniques 500, 600, and 700 of FIGS. 5, 6, and 7, respectively, are each depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for pausing alert notifications, comprising:
   continuously monitoring resolution data for alerts in an information technology environment;
   maintaining a rolling table data structure that automatically updates as alerts resolve to track transient patterns;
   determining that an alert is likely transient responsive to identifying, based on data in the rolling table data structure, that 1) a first number of most recently resolved alerts that are similar to the alert is greater than a predetermined minimum number and 2) at least a predetermined second number of the most recently resolved alerts that are similar to the alert were transient;
   in response to determining that the alert is likely transient, automatically withholding transmission of a notification associated with the alert during a pause period while maintaining the alert in system memory;
   determining whether the alert is unresolved after a lapse of the pause period; and
   in response to determining that the alert is unresolved after the lapse of the pause period, automatically triggering notification transmission to a responder of the alert.

2. The method of claim 1, further comprising:
   triggering the alert responsive to an event in a managed environment.

3. The method of claim 1, wherein determining that the alert is likely transient comprises:
   determining that the alert is likely transient based on a comparison of a normalized title of the alert to respective normalized titles of the most recently resolved alerts.

4. The method of claim 1, wherein the predetermined minimum number is greater than the predetermined second number.

5. The method of claim 3, further comprising:
   obtaining the normalized title from a title of the alert by:
   replacing an identifier in the title with a representative token.

6. The method of claim 5, wherein obtaining the normalized title from the title of the alert further comprises:

replacing a number of a numeric string of the title with a first predefined character.

7. The method of claim 5, wherein obtaining the normalized title from the title of the alert further comprises applying at least one of:
removing newlines from the title;
removing tab characters from the title;
converting the title to a single case; or
replacing at least some punctuation characters with a second predefined character.

8. The method of claim 5, wherein the rolling table data structure comprises a machine learning model that takes as input a vectorized normalized title derived from the normalized title.

9. A system for pausing alert notifications, comprising:
a memory; and
a processor, the processor configured to execute instructions stored in the memory to:
continuously monitor resolution data for alerts in an information technology environment;
maintain a rolling table data structure that automatically updates as alerts resolve to track transient patterns;
determine that an alert is likely transient responsive to a determination, based on data in the rolling table data structure, that 1) a first number of most recently resolved alerts that are similar to the alert is greater than a predetermined minimum number and 2) at least a predetermined second number of the most recently resolved alerts that are similar to the alert were transient;
in response to determining that the alert is likely transient, automatically withhold transmission of a notification associated with the alert during a pause period while maintaining the alert in system memory; and
in response to determining that the alert is unresolved after a lapse of the pause period, automatically triggering notification transmission to a responder of the alert.

10. The system of claim 9, wherein the alert is triggered responsive to a condition occurring in an information technology environment.

11. The system of claim 9, wherein the alert is determined to be likely transient based on a comparison of a normalized title of the alert to respective normalized titles of the most recently resolved alerts.

12. The system of claim 9, wherein the predetermined minimum number is greater than the predetermined second number.

13. The system of claim 11, wherein the processor is further configured to execute instructions stored in the memory to:
obtain the normalized title from a title of the alert by instructions to:
replace a number of a numeric string of the title with a first predefined character.

14. The system of claim 13, wherein to obtain the normalized title from the title of the alert further comprises to:
replace an identifier in the title with a representative token.

15. The system of claim 13, wherein to obtain the normalized title from the title of the alert further comprises to apply at least one of:
remove newlines from the title;
remove tab characters from the title;
convert the title to a single case; or
replace at least some punctuation characters with a second predefined character.

16. The system of claim 13, wherein the rolling table data structure comprises a machine learning model that takes as input a vectorized normalized title derived from the normalized title.

17. A non-transitory computer readable medium storing instructions operable to cause a processor to perform operations comprising:
continuously monitoring resolution data for alerts in an information technology environment;
maintaining a rolling table data structure that automatically updates as alerts resolve to track transient patterns;
predicting that a condition is likely to resolve during a pause period based on data in a rolling table data structure indicating that 1) a first number of most recently resolved conditions that are similar to the condition is greater than a predetermined minimum number and 2) at least a predetermined second number of the most recently resolved conditions that are similar to the condition were transient;
in response to predicting that the condition will resolve during the pause period, automatically pausing performing an action associated with the condition for the pause period; and
in response to determining that the condition did not resolve in the pause period, automatically performing the action.

18. The non-transitory computer readable medium of claim 17, wherein the operations further comprise:
responsive to a status change with respect to the condition, updating the rolling table data structure.

19. The non-transitory computer readable medium of claim 17, wherein the condition is associated with a monitored information technology environment.

20. The non-transitory computer readable medium of claim 17, wherein the predetermined minimum number is greater than the predetermined second number.

* * * * *